(12) United States Patent
Mallary (10) Patent No.: US 8,018,681 B2
(45) Date of Patent: *Sep. 13, 2011

(54) STORAGE DEVICE HAVING MULTIPLE TRACKS FORMED BETWEEN UNDER LAYER TRENCHES

(75) Inventor: Michael Mallary, Sterling, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/701,772

(22) Filed: Feb. 8, 2010

(65) Prior Publication Data

US 2010/0177605 A1 Jul. 15, 2010

Related U.S. Application Data

(62) Division of application No. 11/747,120, filed on May 10, 2007, now Pat. No. 7,663,840.

(60) Provisional application No. 60/747,060, filed on May 11, 2006.

(51) Int. Cl.
*G11B 5/74* (2006.01)
(52) U.S. Cl. ........................................ 360/131; 360/135
(58) Field of Classification Search ........... 360/131–136; 428/826–845.7; 427/127–131
See application file for complete search history.

(56) References Cited

U.S. PATENT DOCUMENTS 7,141,317 B2 * 11/2006 Kikitsu et al. ................ 428/829

* cited by examiner

*Primary Examiner* — Allen J Heinz
(74) *Attorney, Agent, or Firm* — Hollingsworth & Funk, LLC (57) ABSTRACT

A method for fabricating a patterned recording medium includes providing a workpiece with a non-magnetic substrate and at least one overlying magnetic layer, laminating a thermal insulation barrier partially in a soft under layer of one of the at least one magnetic layers and forming a topographical pattern including a plurality of trenches in the soft under layer. Blocks of track triplets are formed between adjacent trenches that are magnetically and thermally insulated from other adjacent blocks of track triplets.

20 Claims, 6 Drawing Sheets

STORAGE DEVICE HAVING MULTIPLE TRACKS FORMED BETWEEN UNDER LAYER TRENCHES

CROSS-REFERENCE TO RELATED PATENT APPLICATIONS

The disclosure is a divisional of U.S. application Ser. No. 11/747,120, filed May 10, 2007 now U.S. Pat. No. 7,663,840, which claims priority to U.S. Provisional Application Ser. No. 60/747,060, filed May 11, 2006. The contents of U.S. Pat. No. 7,663,840 and U.S. Provisional Application Ser. No. 60/747,060 are hereby incorporated by reference.

BACKGROUND OF THE INVENTION

1. Field of the Invention

Embodiments of the present invention relate generally to heat assisted magnetic recording. In particular, embodiments of the present invention relate to a method and apparatus for heat assisted magnetic recording using a patterned recording medium and a method of manufacturing a patterned recording medium used in heat assisted magnetic recording.

2. Related Art

Heat assisted magnetic recording (HAMR) generally refers to the concept of locally heating a recording medium to reduce the coercivity of the recording medium so that an applied magnetic field can more easily direct the magnetization of the recording medium during the temporary magnetic softening of the recording medium caused by the heat source. HAMR has been proposed as a means by which the recording density of hard disc drives may be extended to 1 Tb/in$^2$ or higher. Current conventional hard disc drive technology limited by the superparamagentic limit, which causes the small magnetic grains needed for high density recording media to gradually lose their magnetization state over time due to thermal fluctuations. By using HAMR, the magnetic anisotropy of the recording medium, (i.e., its resistance to thermal demagnetization), can be greatly increased while still allowing the data to be recorded with standard recording fields. For example, a laser beam, acting as a heat source, heats an area on the recording medium (called an "optical hot spot) that is to be recorded and temporarily reduces the anisotropy in just that area sufficiently so that the applied recording field is able to set the magnetic state of that area. After cooling back to the ambient temperature, the anisotropy returns to its high value and stabilizes the magnetic state of the recorded mark.

The main difficulty with HAMR has been discovering a technique that is able to conduct sufficient light energy into the recording medium to heat it by several hundred degrees, but only in the area that is desired to be recorded, which typically will have dimensions on the order of 25 to 50 nm if the recording density is 1 Tb/in$^2$. If the optical hot spot is larger than this area, it will extend to neighboring bits and tracks on the recording medium, and by heating those areas as well, the data recorded in those areas will be erased. Confining the optical hot spot to an area that is much smaller than a wavelength of light, and well below a so-called "diffraction limit" that can be achieved by standard focusing lenses, is an area of study called "near field optics" or "near field microscopy." Conventional techniques have been described for confining light to 20 nm spots or smaller. However, these techniques have not demonstrated a capability for delivering a substantial amount of optical power to the sample within that small spot.

Several drawbacks exist with the near field optics technique of confining the optical hot spot. In general, a near field optics system generates high thermal gradients that define a written bit in both the down track and cross track directions in the presence of a low gradient field that flips the magnetization within the optical hot spot. The thermal conductivity of the recording medium is high so as to generate high thermal gradients but this requires higher power from the laser. Thus, one drawback with the near field optical technique is the requirement of a device or method to concentrate the laser beam in the desired spot efficiently.

Another drawback with the near field optical technique is exposing only one track of the recording medium at a time to the optical hot spot, which causes the spot to be very small. This requires greater concentration of the laser beam resulting in reduced efficiency (i.e., the power in the recording medium divided by the total laser power). When the size of the optical hot spot is much less than the wavelength of the light, it is very difficult to obtain acceptable efficiency because most of the light reflects off the aperture even with cleverly designed electron plasma resonance structures. For example, a 1 Tb/Sq system with a bit aspect ratio of 4 (i.e., bpi/tpi=4) would need a spot size of about 60 nm. This is only 13% of the wavelength of blue light. Thus, the efficiency problem is severe.

An even greater disadvantage with the near field optics technique is the requirement to co-locate the optical hot spot and the write field of the read/write head. This arrangement greatly compromises the write field gradient that is obtainable from the read/write head so that the transition must be defined mainly by the thermal gradient. Also, from a design and manufacturing perspective, it is difficult to optimize the magnetic field and thermal structures simultaneously in a single structure.

Therefore, the need arises for a HAMR system that can extend magnetic recording to higher density by thermally lowering the coercivity of the recording medium in an optical hot spot during a write operation and thus, achieve a higher coercivity recording medium with greater room temperature thermal stability for write operations. The need also arises for a HAMR system that confines the optical hot spot to a narrow region as not to heat adjacent tracks causing adjacent track erasures for many write operations and mitigates the problem associated with combing the magnetic and thermal write operations in the HAMR system.

SUMMARY OF THE DISCLOSURE

Embodiments of the present invention address the problems described above and relate to a method and apparatus for heat assisted magnetic recording using a patterned recording medium and a method of manufacturing a patterned recording medium used in heat assisted magnetic recording.

According to one embodiment of the present invention, a method for fabricating a patterned recording medium includes providing a workpiece with a non-magnetic substrate and at least one overlying magnetic layer, laminating a thermal insulation barrier partially in a soft under layer of one of the at least one magnetic layers and forming a topographical pattern including a plurality of trenches in the soft under layer. Blocks of track triplets are formed between adjacent trenches that are magnetically and thermally insulated from other adjacent blocks of track triplets.

According to another embodiment the of present invention, a method for heat assisted magnetic recording includes generating a light beam on a recording medium having multiple track triplet structures, upstream from writer poles and confining the laser heat from the light beam to one of the track triplet structures. The method also includes rotating the recording medium such that trailing edges of the writer poles reach a heated portion of the recording medium caused by the light beam before the heated portion cools. The light beam and the writer poles are provided in a non-collocated manner due to the heat retained in the heated portion.

According to a further embodiment of the present invention a storage apparatus using heat assisted magnetic recording includes a magnetic recording medium and an arm for positioning a magnetic recording head adjacent to the magnetic recording medium. The magnetic recording medium includes a laminated thermal insulation barrier partially in a soft under layer of one of at least one magnetic layers and a plurality of trenches in the soft under layer, with blocks of track triplets formed between adjacent trenches that are magnetically and thermally insulated from other adjacent blocks of track triplets. The magnetic recording head includes a gang of writer poles positioned above the magnetic recording medium in a non-collocated manner with respect to a light beam.

DETAILED DESCRIPTION OF PREFERRED EMBODIMENTS

A method and apparatus for heat assisted magnetic recording using a patterned recording medium and a method of manufacturing a patterned recording medium used in heat assisted magnetic recording is disclosed. In the following description, numerous details are set forth. It will be appreciated, however, to one skilled in the art, that embodiments of the present invention may be practiced without these specific details. In other instances, well-known structures and devices are shown in block diagram form, rather than in detail.

Figure 1:
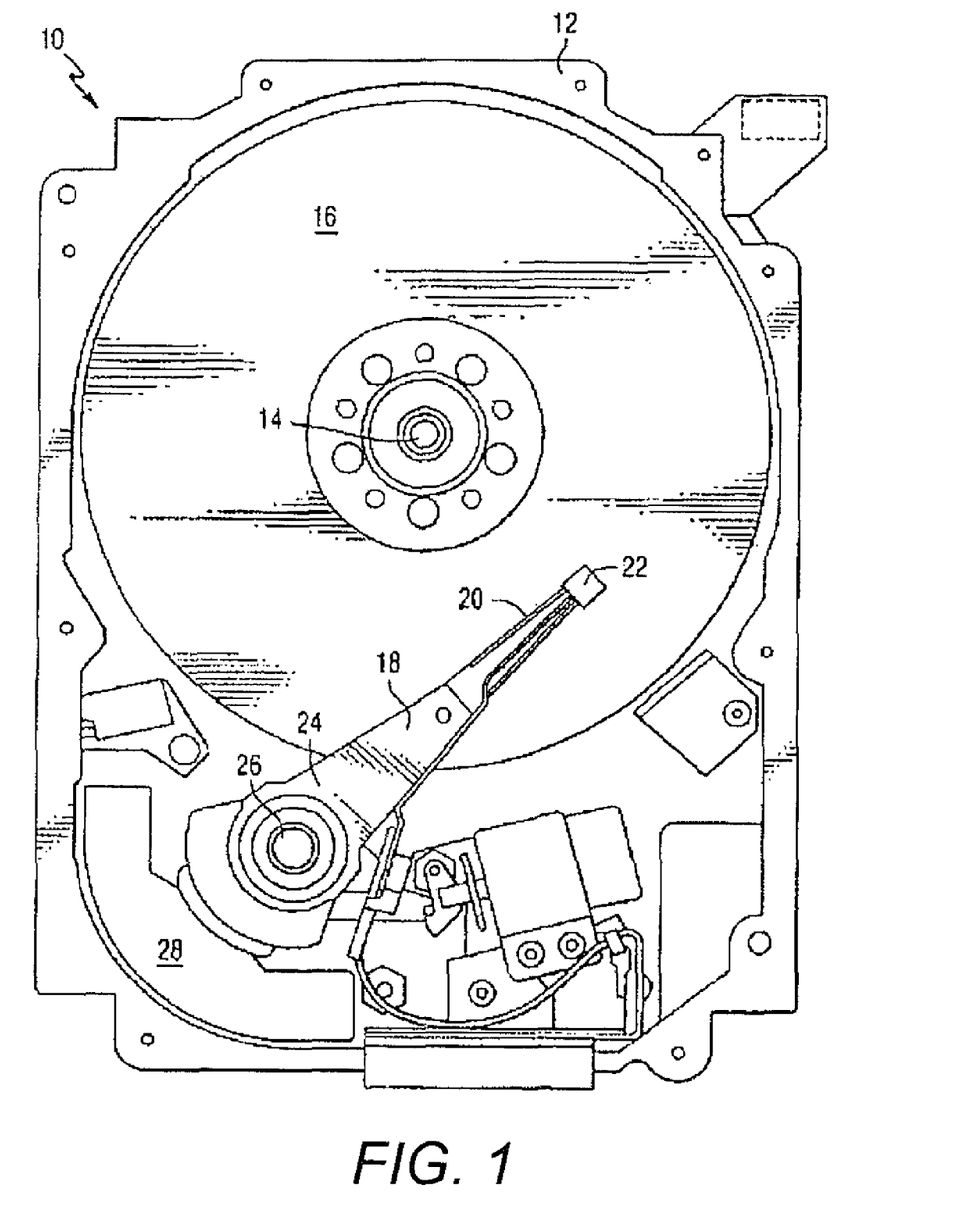
FIG. 1 illustrates generally a pictorial representation of a disc drive system constructed in accordance to one embodiment of the present invention.

An explanation will be given below regarding embodiments of the present invention while referring to the attached drawings. Embodiments of the present invention encompass structures that can be used in recording heads for use with magnetic and/or optical recording medium, as well as magnetic and/or optical recording heads that include such devices and disc drives that include the recording heads. FIG. 1 is a pictorial representation of a disc drive 10 constructed in accordance with embodiments of the present invention. The disc drive includes a housing 12 (with the upper portion removed and the lower portion visible in this view) sized and configured to contain the various components of the disc drive. The disc drive includes a spindle motor 14 for rotating at least one data storage medium (e.g., a disc) 16 within the housing, in this case a magnetic disc. At least one arm 18 is contained within the housing 12, with each arm 18 having a first end 20 with a recording and reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figure 2:
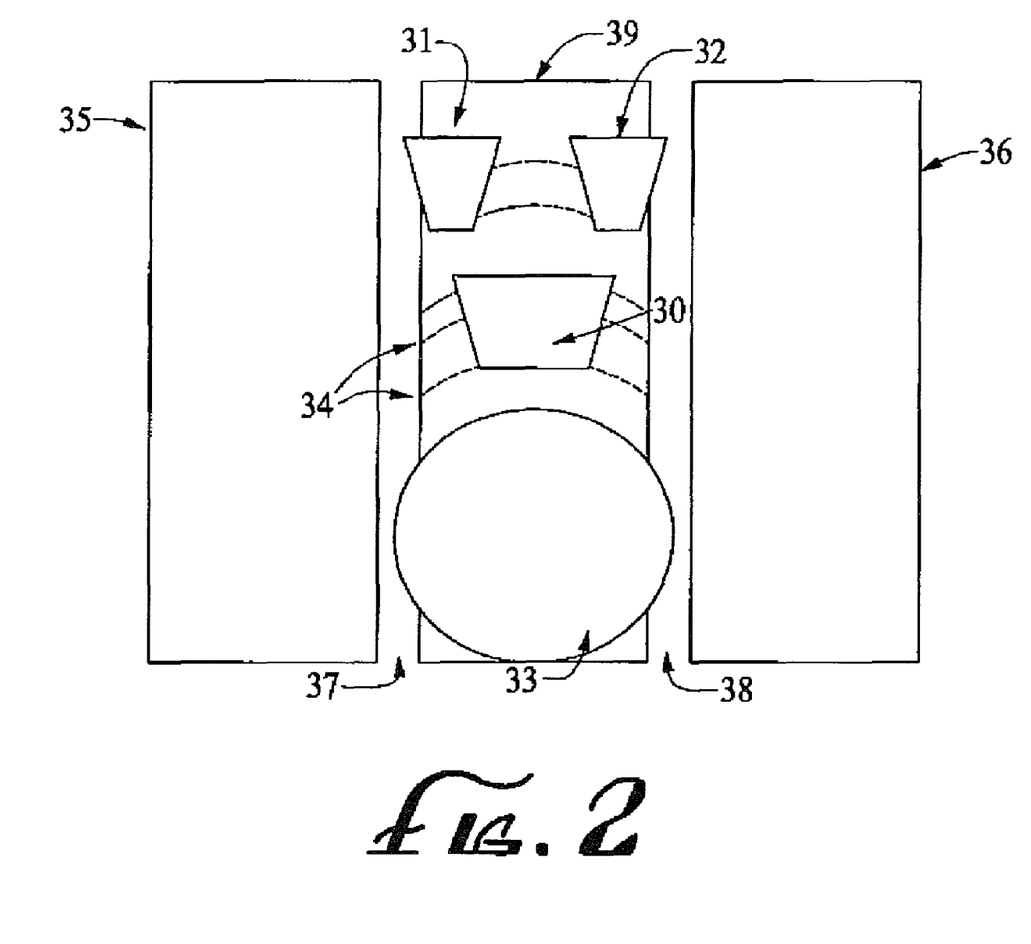
FIG. 2 illustrates a plan view of a heat assisted magnetic recording (HAMR) gang write system and patterned recording medium according to one embodiment of the present invention.

FIG. 2 illustrates a plan view of a heat assisted magnetic recording (HAMR) gang write system and patterned recording medium according to one embodiment of the present invention. The HAMR gang write system which is part of the head 22, is represented by right outer writer pole tip 31, left outer writer pole tip 32 and central writer pole tip 30. The left and right outer writer pole tips 31 and 32 are provided with beveled edges for skew. An optical hot spot 33 (also referred to through the specification as a laser spot), is provided upstream of the HAMR gang write system. The patterned recording medium which forms part of the disc 16, is formed into blocks of track triplets including left adjacent track triplet 35, right adjacent track triplet 36 and center track triplet 39. Adjacent trenches, left trench 37 and right trench 38 are provided between the track triplets. Left adjacent track triplet 35, right adjacent track triplet 36 and center track triplet 39 are magnetically and thermally isolated from other adjacent blocks of track triplets on the disc 16. Left and right adjacent trenches 37 and 38, respectively, provide lateral thermal isolation. This helps lengthen the cooling time constant and prevents heating of the left and right adjacent track triplets 35 and 36, respectively.

Figure 3:
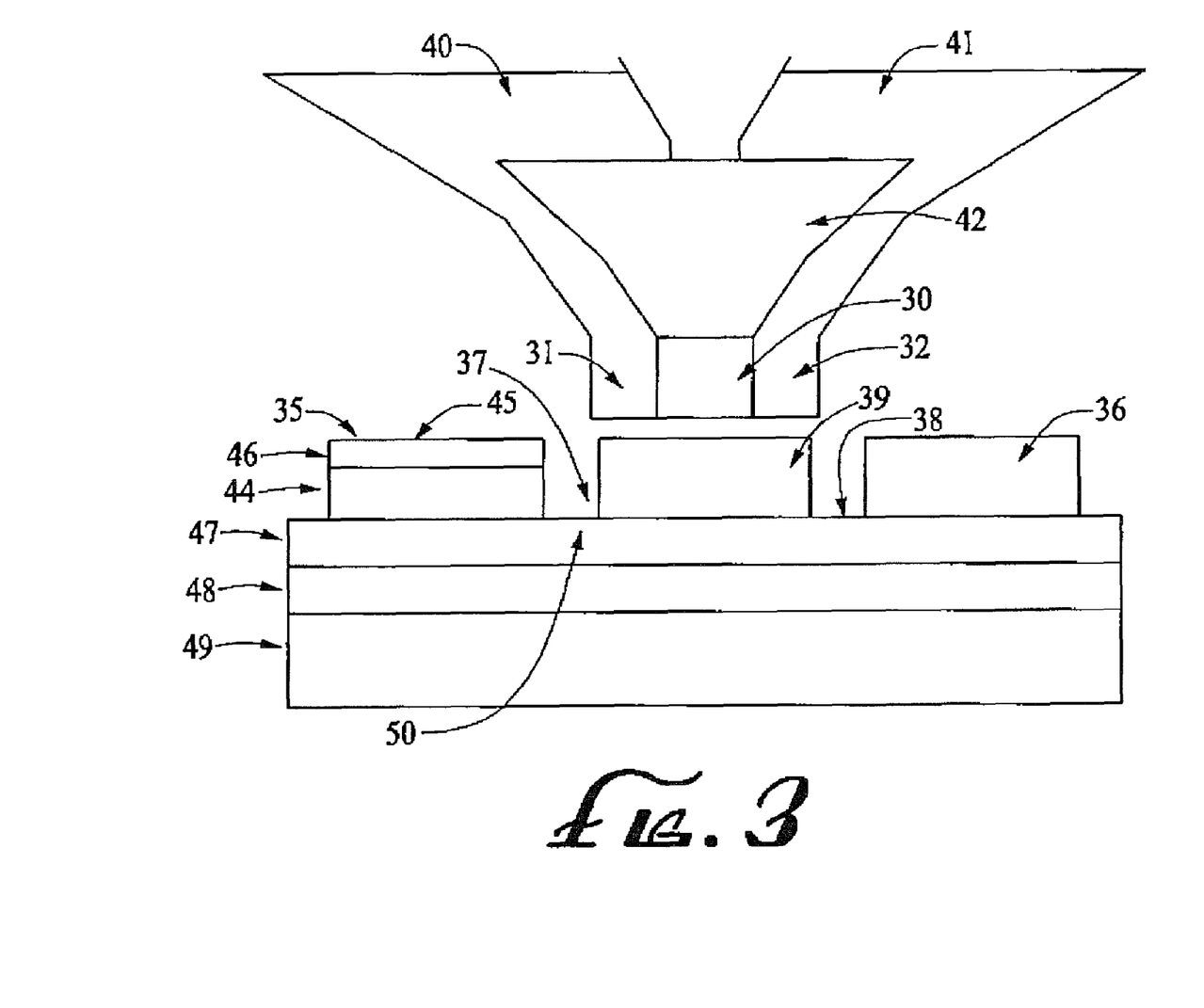
FIG. 3 illustrates a down track cross sectional view of a HAMR gang system and patterned recording medium according to one embodiment of the present invention.

Referring now to FIG. 3, which illustrates a down track cross sectional view of the HAMR gang system and patterned recording medium according to one embodiment Of the present invention, thermal insulation barrier 50 is provided in a partly patterned soft under layer 48 which is below a recording layer 46. A carbon coating 45 is provided above the recording layer 46. To be more precise, thermal insulation barrier 50 is provided between interlayer 44 and a synthetic antiferromagnetic layer 47 which is part of the soft under layer 48. All of these layer rest above substrate 49. Although left adjacent track triplet 35 illustrates the various layers of the disc 16 discussed thus far, the right adjacent track triplet 36 and the center track triplet 39 also include these layers and the discussion applies to these tracks as well. The thermal insulation barrier 50 is a laminated structure as discussed in greater detail below, and has perpendicular anisotropy. As clearly illustrated in FIG. 3, left and right adjacent trenches 37 and 38, extend down to and in a most preferable embodiment of the present invention, extend through the thermal insulation barrier 50 such that the block of track triplets, 35, 36, and 39, fit between left adjacent trench 37 and right adjacent trench 38. Left yoke 40 provides the left writer pole tip 31, right yoke 41 provides the right writer pole tip 32 and center yoke 42 provides the center writer pole tip 30.

According to an alternative embodiment of the present invention, disc 16 could have an unpatterned structure (i.e., no circumferentially patterned trenches). This unpatterned structure would not any way affect the operation and scope of the present invention.

Referring back to FIG. 2, the laser, spot 33 preheats the center track 39 of the disc 16 just upstream of the ganged writer pole tips 30-32. The thermal insulation barrier 50 increases the cooling time constant so that the heated portion of the disc 16 does not excessively cool by the time that it has reached the writing region at the trailing edges of the writer pole tips 30-32 due to the rotation of the disc 16. As stated previously, the left adjacent track triplet 35, the right adjacent track triplet 36 and the center track triplet 39 are magnetically and thermally isolated from other adjacent blocks of track triplets on the disc 16 and the left and right adjacent trenches 37 and 38, respectively, provide lateral thermal isolation which helps lengthen the cooling time constant and prevents heating of the left and right adjacent track triplets 35 and 36. Thus, the combination of the thermal insulation barrier 50 and the left and right adjacent trenches 37 and 38, significantly lengthens the cooling time constant.

As illustrated in FIG. 2, the laser beam spot 33 is allowed to impinge on the disc 16 upstream of the writer pole tips 30-32 because the heat is retained locally for an extended amount of time. Therefore, the laser beam spot 33 and the writer pole tips 30-32 need not be exactly collocated as discussed in the conventional HAMR systems. With this arrangement of the laser beam spot 33 and the writer pole tips 30-32, thermal contours 34 are allowed to develop a relatively straight (across the track width) shape by the time the outer writer pole tips 31 and 32 are reached, so that their transitions do not get an excessive thermally induced skew due to rounded thermal contours.

Figure 4:
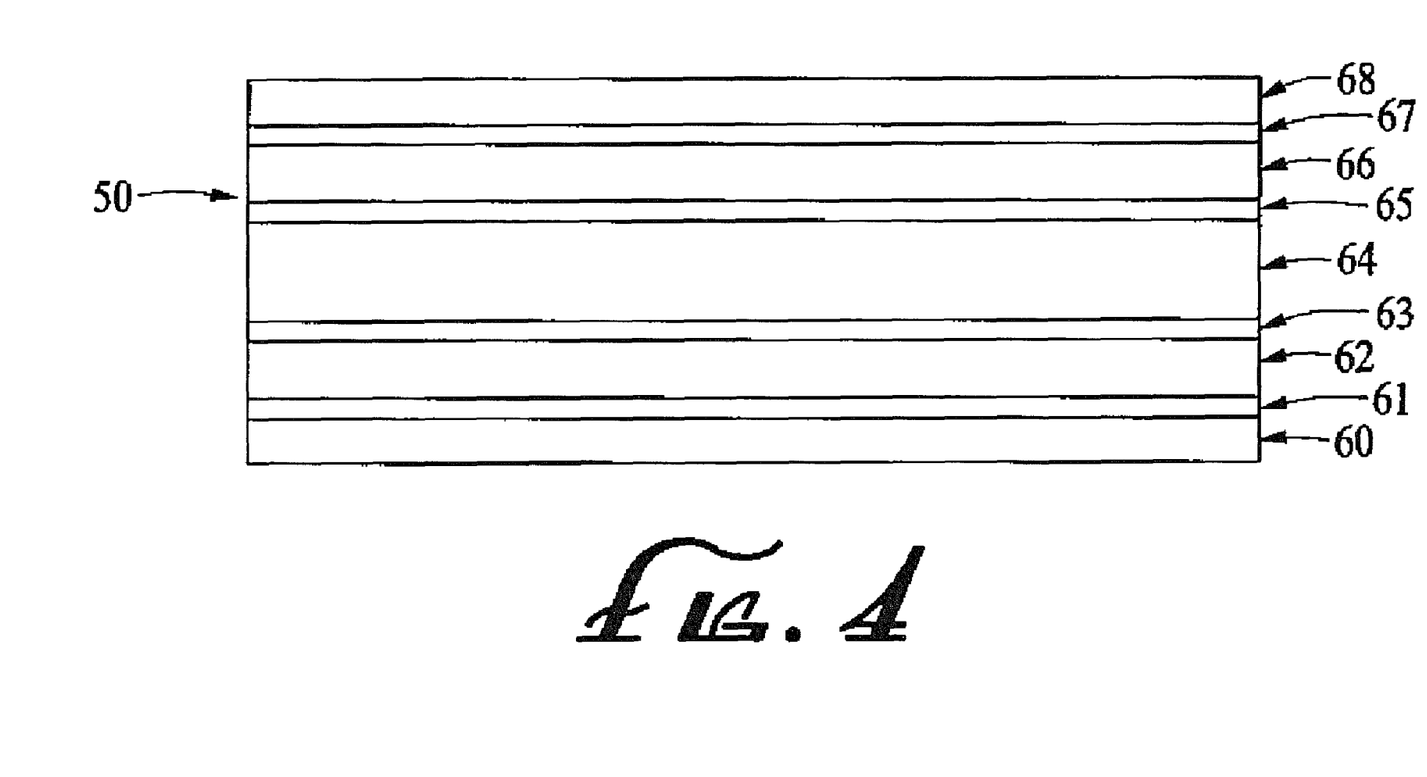
FIG. 4 illustrates a magnetic phononic super lattice thermal insulation barrier recording medium according to one embodiment of the present invention.

According to one embodiment of the present invention as illustrated in FIG. 4, the thermal insulation barrier 50 is formed with alternating layers of amorphous $SiO_x$ and a magnetically soft amorphous alloy of cobalt-zirconium-tantalum (CZT) in order to achieve a low thermal conductivity. The $SiO_x$ layers are low sonic impedance refection layers that provide reflectivity for a range of phonon energies and for both pressure and shear phonons which have different velocities and impedances. The CZT layers are magnetic metal layers that provide magnetic conductance through the thermal insulation barrier 50.

The thickness of the layers are varied so as to provide reflection of a range of phonon, which are energy quantized sonic waves that are the transmitters of lattice heat. As illustrated in FIG. 4 and for example purposes only, the $SiO_x$ layers 61, 63, 65 and 67 have a thickness that vary from 1 to 3 nm while the CZT layers 60, 62, 64, 66 and 68 have a thickness that vary from 5 to 15 nm. With the structure, the thermal insulation barrier 50 forms a super lattice type structure yielding an engineering reflecting coating. Mixing up the thicknesses of the layers prevents selective transmission of particular phonon wavelength. The sonic impedance $Z_{sonic}$ is approximately equal to the Sqrt[(Density*Elastic Modulus)]. The preponderance of a magnetic alloy would maintain low magnetic impedance or good magnetic performance from a soft under layer discussed in greater detail below. This magnetic phononic super lattice structure for the thermal insulation barrier 50 provides good magnetic conductance and thermal impedance.

According to an alternative embodiment of the present invention, the thermal insulation barrier 50 may be formed with alternating layers of amorphous $SiO_x$ and films of tungsten selenide ($WSe_2$) grown from alternating layers pf W and Se layers in an ordered or disordered manner as taught in C. Chiritescu et al., "Ultra Thermal Conductivity in Disordered, Layered $WSe_2$ Crystals," Science, Vol. 315, 2007, pp. 351-353 and K. Goodson, "Ordering Up the Minimum Thermal Conductivity of Solids," Science, Vol. 315, 2007, pp. 342-343. The contents of these articles are incorporated herein by reference.

Figure 6:
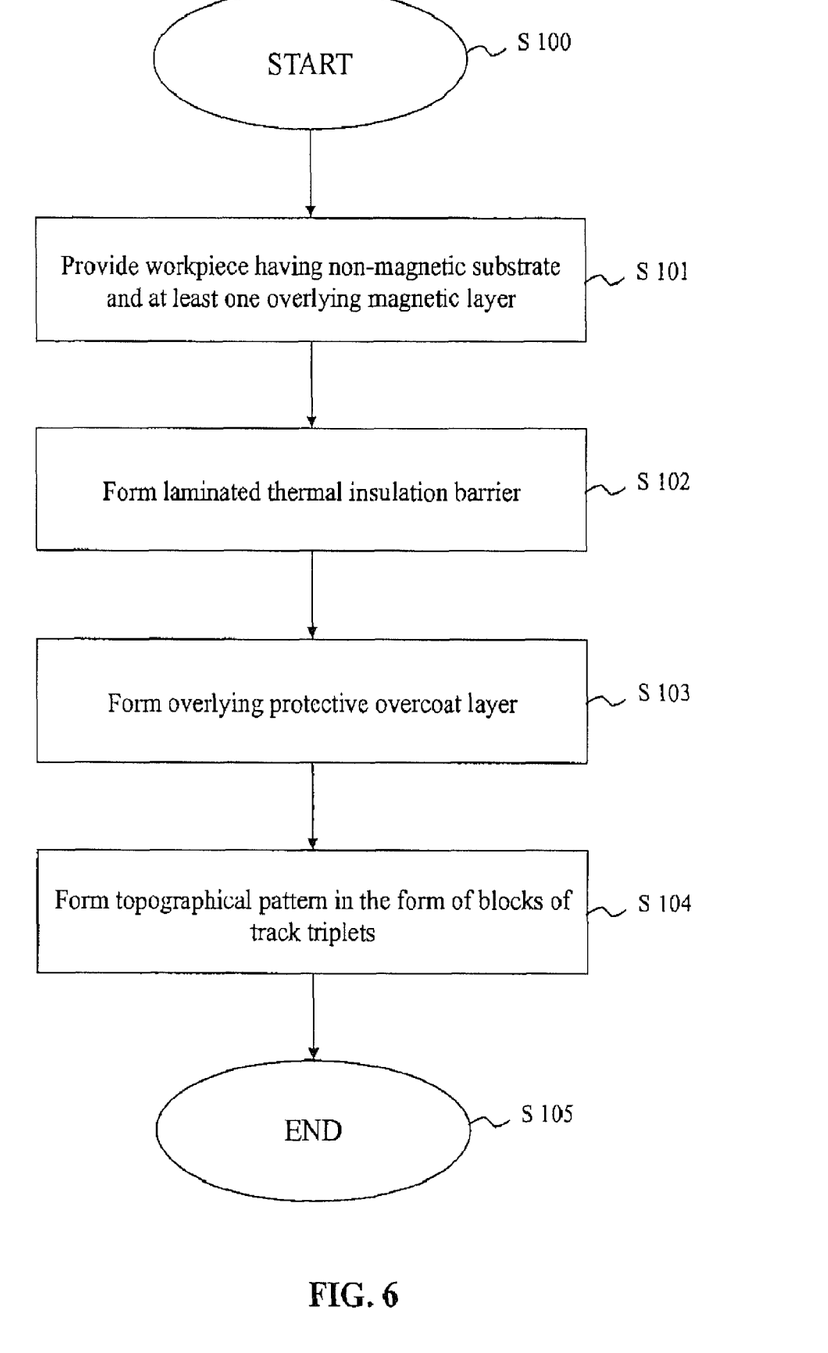
FIG. 6 is a flowchart depicting steps performed in fabricating a patterned recording medium according to one embodiment of the present invention.

FIG. 6 is a flowchart depicting steps performed in fabricating a patterned recording medium according to an embodiment of the present invention. The process begins from a start state S100 and proceeds to process step S101. In the first process step according to the present invention, a workpiece is provided in the form of a thin-film magnetic recording medium comprising a non-magnetic substrate with at least one overlying magnetic layer. Additional layers intermediate the magnetic layer and substrate 2, e.g., seed layers, underlayers, intermediate layers, etc., can be provided. Further, according to the invention, the nature (i.e., type) of magnetic medium is not critical for practice of the invention, and therefore the at least one magnetic layer may be appropriately structured, for example, for longitudinal, perpendicular, laminated, anti-ferromagnetically coupled (AFC), and granular media.

In a second process step S102, according to the present invention, a laminated thermal insulation barrier is formed partially in the soft under layer of one of the magnetic layers. This laminated thermal insulation barrier is formed with alternating low sonic impedance reflection layers and magnetic metal layers. The thicknesses of the layers vary as discussed in greater detail above in FIG. 4.

In a third process step S103, an overlying protective overcoat layer is added. The protective overcoat layer may be formed of any hard, abrasion resistant material suitable for use in hard disk applications, e.g., a diamond-like carbon material.

In a fourth process step S104, according to the present invention, the protective coating layer is subjected to patterning for forming a topographical pattern therein, corresponding to the type of patterned media desired to be formed. As illustrated in FIG. 3, the topographical pattern includes a plurality of elevated areas and recessed areas called trenches of appropriate dimensions and spacings for defining the desired pattern in one of the magnetic layers called a soft under layer. According the present invention, the topographical pattern includes blocks of track triplets that are magnetically and thermally insulated from other adjacent blocks of track triplets. This patterning operation produces an interlayer provided above the thermal insulation barrier which above a synthetic antiferromagnetic layer. The protective coating layer may be topographically patterned via conventional photolithographic techniques.

The process terminates at state S105.

Various alternative embodiments of the present invention are provided below. According to one alternative embodiment of the present invention, the soft under layer 48 could be provided with trenches that separate individual tracks which would help isolate the track triplets from each other magnetically and enhance the write field. According to this alternative embodiment, three times better lithography would be required to produce the disc 16. Also the top region of the soft under layer 48, is narrowed by more than three times which makes the synthetic antiferromagnetic magnetization pattern of the synthetic antiferromagnetic layer 44, harder to achieve (i.e., it would require high anisotropy field in the CZT). The synthetic antiferromagnetic magnetization pattern is important for smooth (low jitter) writing.

Another alternative embodiment of the present invention includes a low thermal conductivity layer based on organic polymers or other materials rather than laminants of $SiO_x$ and CZT for the thermal insulation barrier 50. In addition, the disc cooling time could be enhanced by including high heat capacity and high thermal conductivity (in the circumferential direction) layers above and/or as part of the thermal insulation barrier 50. Therefore, magnetic alloys with high thermal conductivity can be used for the part of the synthetic antiferromagnetic layer 44. An alloy of $CO_{90}Fe_{10}$ is expected to have a thermal conductivity that is ten times better than CZT. If magnetostriction/stress issue causes the synthetic antiferromagnetic layer 44 to not orient radially then an alloy of Ni$_{81}$Fe$_{19}$ is preferable because of its negative magnetostriction (CoFe is positive) even though its thermal conductivity is only five times better than CZT. Finally a layer of very high thermal conductivity material (e.g., Cu, Ag, diamond like carbon) can be provided between the synthetic antiferromagnetic layer 44 and the thermal insulation barrier 50 to further enhance the cooling time constant.

High thermal conductivity in the down track direction can lengthen the effective cooling time a low velocities and thus allow greater laser beam spot to zone separation. Thus, according to a further alternative embodiment of the present invention, using high thermal conductivity materials such as CoFe, for example, for the synthetic antiferromagnetic layer 44, instead of CZT as illustrated in FIG. 3, benefits low velocity applications. According to a further alternative embodiment of the present invention, a high thermal conductivity material such as copper or silver, for example, can be placed between the thermal insulation barrier 50 and the synthetic antiferromagnetic layer 44 to lengthen the effective cooling time.

According to embodiments of the present invention, a thermal insulation barrier coupled with track patterning in the form of block of track triplets, confines the laser heat from a laser to the track that is being written. This allows the laser beam spot to impinge on the disc upstream of the writer pole(s) because the heat is retained locally for an extended amount of time. Therefore, the heat source (i.e., the laser beam spot) and the writer poles need not be exactly collocated. Thus, this mitigates one of the disadvantages of the conventional HAMR systems. With this arrangement of the laser beam spot and the writer poles, thermal contours are allowed to develop a relatively straight shape by the time the outer writer poles are reached, so that their transitions do not get an excessive thermally induced skew due to rounded thermal contours.

In addition, in order to achieve thermal insulation to the adjacent tracks, the trench provided in the soft under layer also provides reduction in fringe field to the neighboring tracks and boost the wire field of the narrow outer pole tips. Thus, the arrangement of the thermal insulation barrier coupled with the track patterning trenches partly through the thermal insulation barrier and a synthetic antiferromagnetic layer, minimize the affects of adjacent track erasure from thermal spreading, minimizes laser power requirements, straightens the thermal contours for higher readable liner bit density, and allows a larger distance between the laser beam spot and the writer pole tips which makes designing more feasible. The thermal insulation barrier is formed of laminated magnetic and ceramic layers for high thermal impedance in the normal direction and low magnetic impedance. The thermal insulation barrier has high thermal conductivity layers in the circumferential direction for lengthening effective cooling time and high thermal capacity layers (all the metal layers plus potential for additional dead layers) above or as part of the thermal insulation barrier.

Figure 5:
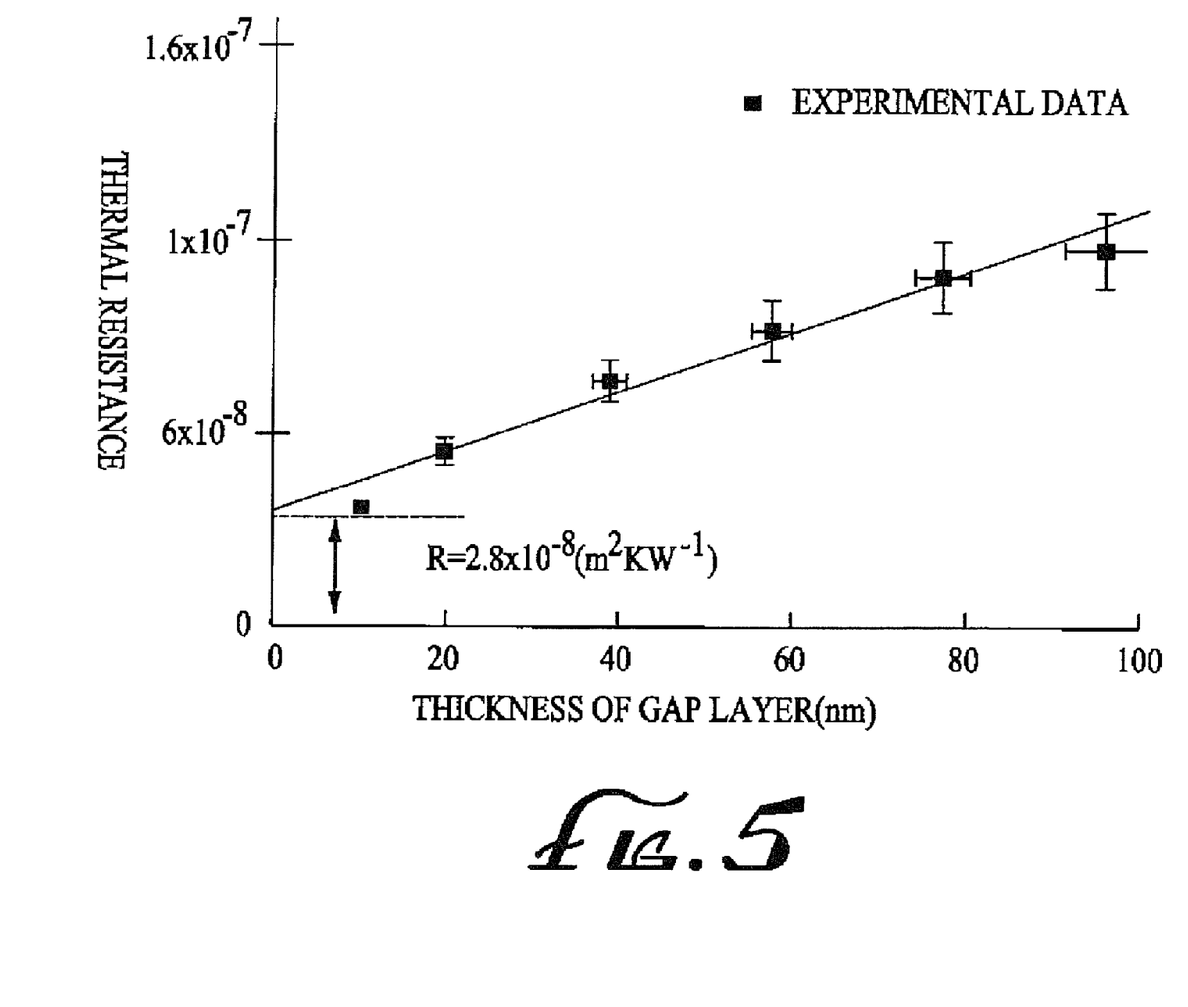
FIG. 5 illustrates a graph of the thermal resistance of a sputtered $Al_2O_3$ verses the thickness of the gap layer.

The following provides an example of manufacturing a magnetic phononic super lattice thermal insulation barrier for a recording medium according to the present invention. In the example, SiO$_x$ is replaced with Al$_2$O$_3$ and the findings of FIG. 5 are referenced in the example.

Example

Approximate calculations (assumes very high media velocity and low thermal conductivity in the circumferential direction), of the thermal time constant (in the case of high media velocity) predict that the cooling time constant, $\tau$ (i.e., $T=T_o\exp(-t/\tau)$), for a laminant of 4×[1 to 3 nm thick Al$_2$O$_3$ and 10 nm thick CZT] under a total thickness of 50 nm of metals (top synthetic antiferromagnetic soft under layer, interlayer and data layer), will be about 25 ns if lateral thermal conductance is prevents by DTR trenches. This calculation multiplies by 4 the thermal resistance (i.e. $R_B$=2.8×10$^{-8}$ m$^2$ K/W) for a very thin Al$_2$O$_3$ between a gold heater and a silicon thermal ground layer that was measured and illustrated in FIG. 5, assuming that the phonon reflectivity from CZT interfaces is similar to that of gold and silicon. This was shown to be better so this is a worse case assumption). This calculated time constant is just the product of the heat capacity per unit area (i.e., C=(heat capacity/area)=(metal heat capacity/volume=3.2 MJ/K° m$^3$)*(average thickness=50 nm+0.5*(40 nm of CZT)=70 nm)=0.224 J/K° m$^2$) of the metals (above the thermal insulation barrier and half way into it) times the thermal resistance through the thermal insulation barrier (i.e., R=4R$_B$=1.12×10$^{-7}$ sm$^2$ K°/J). That is $\tau$=RC=0.224*1.12×10$^{-7}$=25 ns.

The variability in Al$_2$O$_3$ layer thicknesses (i.e., 2 to 4 nm) proposed here allows each layer to maximize its phonon reflectivity for different phonon energy ranges. This calculation assumes an Al$_2$O$_3$ ceramic because data is available for it. The preferred embodiment using amorphous SiO$_x$ layers is expected to have even larger thermal impedance (~x2 larger), longer cooling times, and less temperature drop between the laser spot and the most down stream outer writer pole tip.

If the down stream edge of the outer writer poles is 0.4µ down stream of the laser spot edge and the media velocity is 40 m/s, then the transit time is 10 ns. Therefore the data layer will cool by only 33% (i.e., 1−exp (−10/25)=0.33) by the time it has passed the most remote outer pole tips. The media under the pole surface where old data is overwritten will be even hotter thus enhancing the overwrite process. In addition, the thermal gradient will combine (weakly) with the write field gradient to yield sharper transitions.

Calculations predict that the required absorbed power for the above conditions with a 500 ktpi system (i.e., 6µ" per track triplet) is only 0.4 mW for heating up to 320° C. at a media velocity of 40 m/s. This is a very feasible amount of power in that it allows for low transfer efficiency through the near field optics.

The increase in effective cooling time, $\tau$, provided by high heat capacity and high circumferential thermal conductivity is quantified by the following equation:

$$\tau = (2C_c/kv^2)/(-1+\text{Sqrt}[1+4C_c/(Rdk^2v^2)]) \tag{1}$$

where: v is the media velocity(m/s); $C_c$ is the circumferential thermal conductance average over the thickness of all of the layers above the thermal insulation barrier (e.g., Co$_{90}$Fe$_{10}$ has $C_c$~400 J/smK°); k is the average heat capacity (e.g., k=3.2×10$^6$ J/K° m$^3$ for typical metals which are nearly equal for most metals) of the metal layers above the thermal insulation barrier; d is the total thickness (e.g., d=7×10$^{-8}$ m) of the layers; and R is the thermal impedance of the thermal insulation barrier (e.g., R=1.12×10$^{-7}$ sm$^2$K°/J for a 4 layer alumina [more for SiO$_x$] based magnetic phononic super lattice type thermal insulation barrier).

For high velocity (defined by 4 $C_c/(Rdk^2v^2)$<<1) Eq 1 reduces to:

$$\tau \sim Rkd = 25 \text{ ns for the above parameters as before} \tag{2}$$

However the approximation that 4 $C_c/(Rdk^2v^2)$<<1 is not even achieved for a CZT synthetic antiferromagnetic soft under layer above the thermal insulation barrier let alone for a CoFe based one. When the above assumed values for the parameters (CoFe synthetic antiferromagnetic soft under layer) in Equation 1 are assumed the calculated effective time constant is $\tau$=59 ns even at v=40 m/s. Therefore, the temperature reduction from the maximum at the outer write zones (0.4µ down stream) is only 16%.

For a CZT based synthetic antiferromagnetic soft under layer, the circumferential thermal conductance is 10 times worse (i.e., $C_c$=40 J/s mK°) worse so the resulting effective cooling time is $\tau$=31 ns. This is almost half of that for a CoFe synthetic antiferromagnetic soft under layer. The resulting reduction in temperature at the outer writer poles is then 28%. The difference between these numbers and the approximate ones (i.e., $\tau$~25 ns and temperature loss=33%) is due to the fact that 4 $C_c(Rdk^2v^2)$~1 and not <<1 for a CZT synthetic antiferromagnetic soft under layer. So the temperature loss for CZT is almost twice that of CoFe.

The thermal time constant, $\tau$, calculated by Equation 1 above gives the rate of exponential decay of the temperature at a point in the moving media. Correspondingly, at an instant in time the temperature decays exponentially with a decay length of $\Delta$ as one moves away from the laser spot. Of course the relation between these constants is:

$$\Delta = V\tau \quad (3)$$

And the temperature verses time and position in the rest frame of the media, $X_m$, is given by:

$$T = T_{max}\exp(-t/\tau - X_m/\Delta) \quad (4)$$

The position in the rest frame of the head is just:

$$X_h = X_m - vt \quad (5)$$

So in the rest frame of the head, with the laser spot trailing edge at $X_h$=O, the thermal profile at all times is given by:

$$T = T_{max}\exp(-x_h/\Delta) = T_{max}\exp(-x_h/V\tau) \quad (4)$$

And the fractional temperature loss verses distance from the laser spot edge is:

$$\text{Loss Fraction} = 1 - T/T_{max} = 1 - \exp(-x_h/V\tau) \quad (5)$$

Of course it may be desirable to minimize this loss to: reduce adjacent track erasure; and to minimize the maximum temperature in the media to prevent reliability problems associated with lube loss (and deposition on the optics) and materials degradation in the head and media; and to minimize the required laser power.

Calculations for the magnetic phononic super lattice structure for the thermal insulation barrier are as follows. The compression wave sonic velocity in a media is:

$$Vs = \text{sqrt}(Y/\rho) \quad (6)$$

where Y is the elastic modulus and $\Gamma$ is the density. The sonic impedance is analogous to the impedance of a transmission line and is:

$$Z = \text{sqrt}(Y\rho) \quad (7)$$

The reflection coefficient at the junction with a dissimilar material with impedances Z and z is:

$$R = (Z-z)/(Z+z) \quad (8)$$

The fraction of incident power reflected is $R^2$. Negative R corresponds to a 180° phase shift in the reflected wave.

It may be desirable to maximize the absolute value of R for a range on phonon energies, E, near the average thermal excitation energy for three degrees of freedom (i.e., E=3 kT/2=6×10$^{-21}$ where k is Boltzman's constant and T is degrees Kelvin). The frequency, f, of the phonons is f=h/E=9 THz (i.e., h=Plank's constant=6.6×10$^{-34}$ J). For metals such as iron the compression wave sonic velocity, v, if about 6000 m/s so the wavelength of the average phonon is $\lambda$=v/f=7 Angstroms. For shear waves the velocity is about half so the wavelength is about 3.5 Angstroms. For amorphous $SiO_x$ the velocities are expected to be about half again so the corresponding wavelengths are reduced by another factor of two. Therefore, $SiO_x$ layers of the order of 1 nm thick will contain many wavelengths and constructive interference (from the two surfaces) of the phonons propagating through the layer will be minimized. That is that the $SiO_x$ will not act like an antireflection coating for average phonons. By using a range of layer thickness (i.e., 1 to 3 nm) and thick CZT layers, constructive interference and transparency to particular phonon energies and incident angles is avoided. This is the essence of the magnetic phononic super lattice approach to a thermal insulation barrier.

If we use a single layer of low Z low thermal conductivity material such as the commonly used photosensitive organic material known as polymethylmethacrylate (PMMA) the thermal resistivity will be enhanced by the phonon surface scattering so it will get a contribution of magnitude $R_D$=2.8× 10$^{-8}$ sm$^2$K°/J similar to the result of shown in FIG. 5. In order to quadruple the thermal resistance from this value (i.e., resistance used in the conceptual magnetic phononic super lattice design discussed here) the thickness of the PMMA would have to be about 20 nm thick (i.e., d=RC=3 $R_B$C=20 nm for C~0.25 J/smK°. This would be a significant increase in magnetic impedance (i.e., ~x2) over the proposed magnetic phononic super lattice and it would incur the fragility penalty discussed above. However a material research effort might uncover a low thermal conductivity material that would be suitable for this application and thus avoid the need for the magnetic phononic super lattice enhancement of the present invention.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A device comprising:
   a soft under layer comprising a plurality of trenches;
   a plurality of blocks of track triplets formed in between each of the plurality of trenches, wherein each of the blocks of track triplets are magnetically and thermally insulated from other adjacent blocks of track triplets; and
   a thermal insulation barrier under the blocks of triplets, the thermal insulation barrier includes alternating low sonic impedance reflection layers and magnetic metal layers.

2. The device according to claim 1, wherein the low sonic impedance reflection layers comprise amorphous $SiO_x$.

3. The device according to claim 1, wherein the low sonic impedance reflection layers comprise $Al_2O_3$.

4. The device according to claim 1, wherein thicknesses of the low sonic impedance reflection layers and the magnetic metal layers are different.

5. The device according to claim 1, wherein thicknesses of the low sonic impedance reflection layers are between 1 to 3 nm.

6. The device according to claim 1, wherein thicknesses of the magnetic metal layers are between 5 to 15 nm.

7. The device according to claim 1, wherein the magnetic metal layers comprise a metal selected from the group consisting of cobalt, zirconium, tantalum and alloys thereof.

8. A device comprising:
a soft under layer comprising a plurality of trenches;
a plurality of blocks of track triplets formed in between each of the plurality of trenches, wherein each of the blocks of track triplets are magnetically and thermally insulated from other adjacent blocks of track triplets; and
a thermal insulation barrier under the blocks of triplets, the thermal insulation barrier comprises tungsten selenide.

9. A device comprising:
a soft under layer comprising a plurality of trenches;
a plurality of blocks of track triplets formed in between each of the plurality of trenches, wherein each of the blocks of track triplets are magnetically and thermally insulated from other adjacent blocks of track triplets; and
a synthetic antiferromagnetic layer under the blocks of triplets and below the thermal insulation barrier.

10. The device according to claim 9, further comprising:
a thermal conductive material between the synthetic anti ferromagnetic layer and the thermal insulation barrier.

11. A device comprising:
a soft under layer comprising a plurality of trenches;
a plurality of blocks of track triplets formed in between each of the plurality of trenches; and
a thermal insulation barrier under the blocks of triplets, the thermal insulation barrier includes alternating low sonic impedance reflection layers and magnetic metal layers.

12. The device according to claim 11, wherein the low sonic impedance reflection layers comprise amorphous $SiO_x$.

13. The device according to claim 11, wherein the low sonic impedance reflection layers comprise $Al_2O_3$.

14. The device according to claim 11, wherein thicknesses of the low sonic impedance reflection layers and the magnetic metal layers are different.

15. The device according to claim 11, wherein thicknesses of the low sonic impedance reflection layers are between 1 to 3 nm.

16. The device according to claim 11, wherein thicknesses of the magnetic metal layers are between 5 to 15 nm.

17. The device according to claim 11, wherein the magnetic metal layers comprise a metal selected from the group consisting of cobalt, zirconium, tantalum and alloys thereof.

18. A device comprising:
a soft under layer comprising a plurality of trenches;
a plurality of blocks of track triplets formed in between each of the plurality of trenches; and
a thermal insulation barrier under the blocks of triplets, the thermal insulation barrier comprises tungsten selenide.

19. A device comprising:
a soft under layer comprising a plurality of trenches; and
a plurality of blocks of track triplets formed in between each of the plurality of trenches; and
a synthetic anti ferromagnetic layer under the blocks of triplets and below the thermal insulation barrier.

20. The device according to claim 19, further comprising:
a thermal conductive material between the synthetic anti ferromagnetic layer and the thermal insulation barrier.

* * * * *